United States Patent [19]

Harrold et al.

[11] Patent Number: 5,536,910
[45] Date of Patent: Jul. 16, 1996

[54] SOUND, RADIO AND RADIATION WAVE-ABSORBING, NON-REFLECTING STRUCTURE AND METHOD THEREOF

[75] Inventors: Ronald T. Harrold, Murrysville Boro; Zal N. Sanjana, Mt. Lebanon, both of Pa.

[73] Assignee: Northrop Grumman, Los Angeles, Calif.

[21] Appl. No.: 103,621

[22] Filed: Aug. 9, 1993

[51] Int. Cl.⁶ .................. E04B 1/82; E04B 1/84
[52] U.S. Cl. ............................. 181/290; 181/294
[58] Field of Search ................. 181/286, 288, 181/289, 290, 291, 292, 293, 294, 296; 428/425, 447, 493, 515

[56] References Cited

U.S. PATENT DOCUMENTS

| | | | |
|---|---|---|---|
| 3,630,312 | 12/1971 | Woodward | 181/290 |
| 3,632,703 | 1/1972 | Sullivan et al. | 428/308 |
| 3,670,843 | 6/1972 | Kelly et al. | 181/290 |
| 3,894,169 | 7/1975 | Miller | 181/290 X |
| 3,948,346 | 4/1976 | Schindler | 181/290 |
| 4,013,810 | 3/1977 | Long | 428/308 |
| 4,354,132 | 10/1982 | Borburgh et al. | 310/334 |
| 4,367,259 | 1/1983 | Fulmer et al. | 428/240 |
| 4,590,803 | 5/1986 | Harrold | 73/590 |
| 5,146,047 | 9/1992 | Nagata et al. | 174/35 MS |

OTHER PUBLICATIONS

*Stealth Technology, The Art of Black Magic*, J. Jones, edited by Matt Thurber, AERO, Copyright, 1989, pp. 48–51.

*Primary Examiner*—Michael L. Gellner
*Assistant Examiner*—Eddie C. Lee

[57] ABSTRACT

A non-reflecting, wave-absorbing structure absorbs sound, radio and radiation wave. The non-reflecting, wave-absorbing structure combines an outer non-reflecting wave structure and a wave-absorbing portion. The outer non-reflecting wave structure allows for the transmission of the wave therethrough without appreciable reflection and the wave-absorbing material absorbs substantially all of the transmitted wave. In the case the wave to be absorbed in a sound wave, the wave-absorbing material is preferably an epoxy in a chemical state of gelatinization which is prevented from reaching a state of cure.

13 Claims, 5 Drawing Sheets

SOUND, RADIO AND RADIATION WAVE-ABSORBING, NON-REFLECTING STRUCTURE AND METHOD THEREOF

BACKGROUND OF THE INVENTION

1. Field of the Invention

This invention relates to an apparatus and method for the absorption of sound, radio and radiation waves. More particularly, this invention concerns the combination of a non-reflecting wave structure and a wave-absorbing portion.

2. Description of the Prior Art

Both sound waves and radio waves share the characteristic of being reflected upon contacting an object. In some instances, reflection of sound and radio waves from an object may be undesirable.

Sonar and radar are based on the reflection characteristic of sound and radio waves, respectively. A transmitter outputs a sound or radio wave pulse which contacts an object and is then reflected. A receiver is positioned to accept the reflected wave while observing the direction of the reflected wave and the amount of time it makes the wave to travel to and from the object. Thus, knowing the travel time of the wave and the speed of the wave, the position of the object can be determined. In the case of stealth submarines and stealth aircraft, it is desirable for the submarines and aircraft to be invisible to sonar and radar, respectively.

When sound waves contact an object the reflected waves can interfere with one another causing distortion of the sound waves. If constructive interference occurs, the sound waves reinforce one another to produce a resultant sound wave with increased intensity. If destructive interference occurs, the resultant sound wave will be of smaller intensity than the intensity of each of the interfering waves. Sound waves having different frequency and interfering with one another may result in beat which is heard as bursts of increased sound. Further, if the resultant wave frequency is at a natural frequency of a nearby body, unwanted vibration of the body can occur. In all of these instances, it may be advantageous to prevent distortion of the waves in order to maintain both purity of sound and structural integrity of nearby bodies.

The prior art prevents both distortion of waves and detection of objects using sonar and radar by attempting to absorb the waves before the waves are reflected from objects.

Prior art devices may utilize honeycomb panels and porous materials alone and in combination with one another to absorb and attenuate sound waves, Honeycomb panels composed of resonant chambers may be provided in ceiling structures, aircraft engines, and gas turbine engines in order to reduce noise and vibration. Sound waves passing through the resonant chambers are transformed into sound waves having different frequencies resulting in decreased noise and vibration.

Porous materials including fibrous structures may also be utilized in both ceiling panel and engine construction to absorb and attenuate sound waves. The sound waves move through the pores and encounter fibers which provide a frictional drag on the waves thus, converting the sound waves into heat which is released into the atmosphere. The porous material can be open-celled foam, fiberglass, mineral wool or felt.

The degree of sound absorption and sound attenuation can be increased by utilizing porous material in combination with honeycomb panels. Porous material can be provided within the resonant chambers of the honeycomb panels. Alternatively, the honeycomb panels and porous materials can be layered to form a sound attenuating panel.

Some prior art devices employ materials containing finely powdered carbon and iron to attenuate radio waves. *Stealth Technology The Art of Black Magic*, J. Jones, copyright 1989, discloses both ferrite-based coatings and polymer coatings containing carbon and being utilized as radar absorbing materials.

Each of the noted-prior art devices do not provide a non-reflecting wave structure being combined with a wave-absorbing portion.

SUMMARY OF THE INVENTION

An apparatus and method practicing the presently preferred invention absorbs sound, radio and radiation waves by positioning a non-reflecting wave structure combined with a wave-absorbing portion in the path of the sound, radio or radiation waves. The non-reflecting wave structure allows the wave to be transmitted therethrough without appreciable reflection of the wave. Once the wave is transmitted through the non-reflecting wave structure it is then absorbed by the wave-absorbing portion.

In the instance where the waves to be absorbed are sound waves the presently preferred invention provides the material of the wave-absorbing portion being in a chemical state of gelatinization which is defined as the transition from a liquid state to that of a rubbery gel. The sound wave-absorbing material is preferably an epoxy in a state of gelatinization. However, any material able to exhibit properties of an epoxy in a state of gelationization can be utilized as the sound wave-absorbing material. Some examples of other sound wave-absorbing materials are: concrete in a state of gelationization, polyurethane in a gelationization state, metals in a molten state, plastics in a molten state and waxes in a molten state.

The non-reflecting sound wave structure preferably has an acoustic impedance which matches the acoustic impedance of the medium in which the sound wave is traveling. Acoustic impedance is the product of the density ($\rho$) of the medium in which the sound wave is traveling and the velocity (c) of the sound wave in the medium. The acoustic impedance can be utilized to describe and measure the reflection of the sound wave at the interface of two media. Reflection of sound waves occurs at an interface of two materials having an acoustic impedance mismatch between the two materials. The reflection of sound waves at the interface of the media can be calculated from equation No. 1:

$$R = \frac{\rho_1 c_1 - \rho_2 c_2}{\rho_1 c_1 + \rho_2 c_2} \qquad \text{EQUATION 1}$$

Thus, if the medium in which the sound wave is traveling and the object upon which the sound wave is impinging have different acoustic impedances, the sound wave will be reflected at the medium/object interface. By providing an acoustic impedance match between the medium and the object no appreciable reflection of the sound wave will occur and the sound wave will be substantially transmitted through the object.

When the waves to be absorbed are radio waves, the presently preferred invention provides for the wave-absorbing material to preferably be a plasma, a gas in an ionized state, which is known to absorb radio waves. An application of a radio wave-absorbing plasma is the plasma created around the space shuttle. When the space shuttle returns to earth from orbit intense friction between the outer surface of the shuttle and air molecules surrounding the shuttle generates electrons and positively charged particles to form a plasma around the shuttle. Radio contact between the ground mission control and the shuttle is lost due to radio wave absorption by the plasma. Some examples of solid materials which can be used for absorbing radio waves are carbon filled polymers and epoxies.

The presently preferred invention provides for the non-reflecting radio wave structure to be made from materials having a low dielectric constant. Low dielectric constant materials are substantially transparent to radio waves. Some examples of materials having low dielectric constants are tetrofluroethylene, polyethylene, and wood.

The presently preferred invention can be utilized in stealth technology for the purpose of making vehicles, vessels or aircraft invisible to sonar or radar, respectively. Further, the presently preferred invention can be utilized in preventing sound waves originating from within a vessel from escaping from the vessels and being detected by sonar.

Other applications of the presently preferred non-reflecting, sound wave-absorbing structure include quieting of machinery, homes and offices and controlling acoustics in concert halls.

Other details, objects and advantages of the invention will become more readily apparent as the following description of presently preferred embodiments thereof proceeds.

BRIEF DESCRIPTION OF THE DRAWINGS

The accompanied drawings show presently preferred embodiments of the invention in which.

DETAILED DESCRIPTION OF THE PRESENTLY PREFERRED EMBODIMENTS

Figure 1:
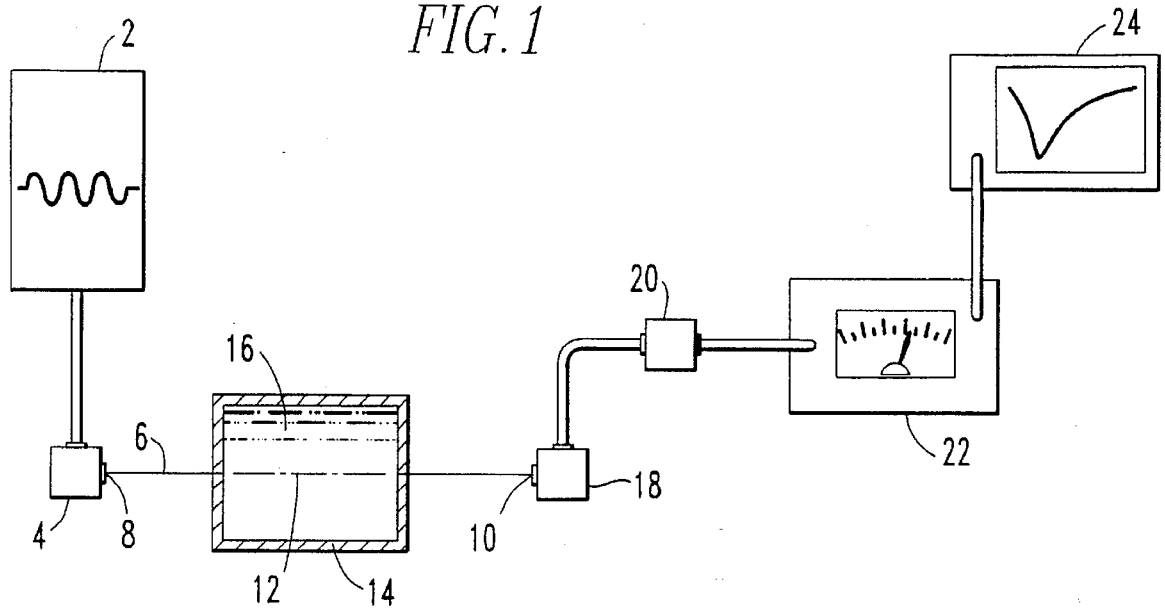
FIG. 1 is a schematic of apparatus utilized in the measurement of the transmission of an acoustic signal through curing epoxy.

Referring to FIG. 1, test apparatus used to measure the transmission of an acoustic signal in curing epoxy is shown. A signal generator 2 (Wavetek Model 191) is electrically connected to transducer 4. Waveguide 6 having a first end 8, second end 10 and an intermediate portion 12 is acoustically connected at its first end 8 to transducer 4 with a bonding material (not shown). Waveguide 6 is made from Nichrome and has a diameter of 20 mil. The waveguide intermediate portion 12 is positioned in tray 14 which contains epoxy 16. The waveguide second end 10 is acoustically connected to acoustic transducer 18 with a bonding material (not shown). A 30 KHz high-pass filter 20 is electrically connected to both acoustic transducer 18 and peak reading meter 22. Peak reading meter 22 is also electrically connected to chart recorder 24.

The apparatus shown in FIG. 1 is operated in the following manner. Signal generator 2 produces an electrical pulsed wavetrain signal at 70 KHz which is transmitted to transducer 4. The electrical signal is converted by a transducer 4 into an acoustic signal and then transmitted through waveguide 6. The acoustic signal traveling through the waveguide 6 is transmitted to acoustic transducer 18. Acoustic transducer 18 converts the acoustic signal into an electrical signal. The electrical signal is then passed through 30 KHz high-pass filter 20 and then inputted into peak reading meter 22. An oscilloscope (not shown) can also be used in the place of the peak reading meter 22. Last, the electrical signal from the peak reading meter 22 is recorded using chart recorder 24 plotting the magnitude of the signal transmitted through the waveguide versus cure time of the epoxy. The above-process is repeatedly conducted in order that waveguide transmitted signals are recorded at different time intervals during the cure time of the epoxy 16.

Figure 2:
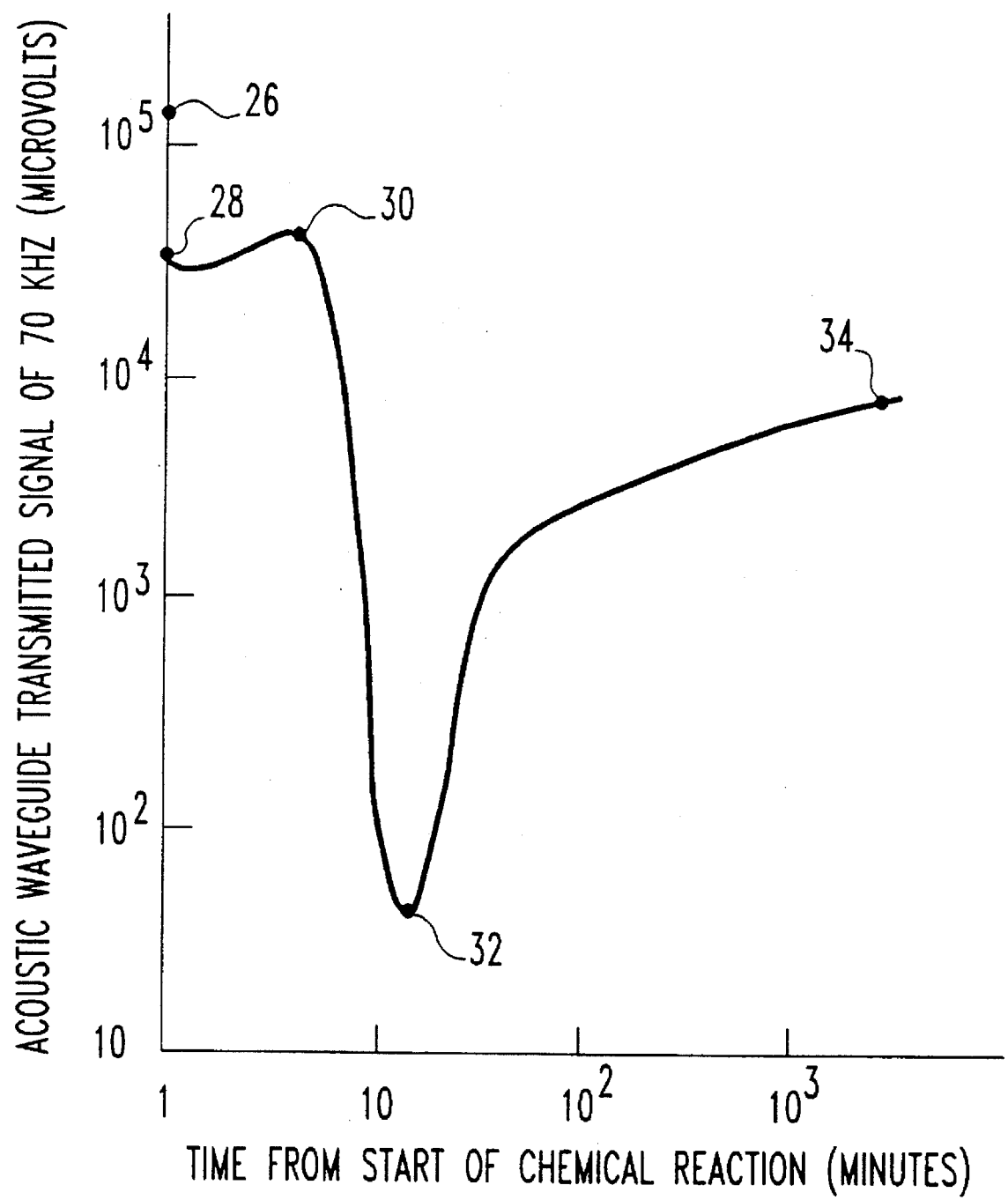
FIG. 2 is a graph presenting data recorded by the apparatus shown in FIG. 1.

The results of the test using the apparatus of FIG. 1 are presented in FIG. 2 in a graph which plots acoustic waveguide transmitted signal versus cure time (t). For comparison purposes, measurements are taken of a signal transmitted through waveguide 6 when waveguide 6 is surrounded by air before the epoxy is poured, t=0. At this time, waveguide transmitted signal of approximately $2 \times 10^5$ microvolts (µv) will be recorded at 26. After the epoxy is poured and settled around the waveguide (still t=0), the waveguide transmitted signal decreases to approximately $3 \times 10^4$ µv at 28. Between t=0 and t=~3 minutes the magnitude of the transmitted signal will remain substantially constant at $3 \times 10^4$ µv. At t=~4 minutes, the magnitude of the transmitted signal increases to a maximum of approximately $5 \times 10^4$ µv at 30. During the interval defined by t=~4 minutes, and t=~15 minutes, the magnitude of transmitted signal decreases to a minimum of approximately 40 µv at 32. The minimum transmitted signal occurs during the gelationization state of the epoxy 16 defined by the time interval of t=~12 minutes and t=~16 minutes. As the epoxy reaches full cure, t=~3000 minutes, the magnitude of the waveguide transmitted signal increases to a value of approximately $8 \times 10^3$ µv at 34.

Before gelation the waveguide transmitted signal is attenuated by the increasing viscosity of the surrounding epoxy resin. After gelation, the waveguide transmitted signal increases as the resin hardens and its modulus increases. As can be seen from the above test, there is a substantial decrease of approximately three orders of magnitude in the magnitude of transmitted signal when the epoxy is at a state of gelationization.

The sound wave-absorbing property of epoxy at a state of gelationization found in the above-described test is then utilized in the following application to demonstrate the general principle of the presently preferred invention. An epoxy/stainless steel sandwich structure 36 shown in FIG. 3 can be constructed having five surfaces: a front face 38, back face 40 and three side faces 42 forming chamber 44. The front face 38 is a 10 cm ×10 cm ×0.6 cm epoxy plate loaded with microspheres 46 where microspheres are hollow ceramic spheres. The back face 40 is spaced 1 cm apart from the front face 38 and made from stainless steel. The remaining side faces 42 are made from silicone rubber.

The microsphere-loaded front face 38 is capable of transmitting sound waves without appreciable reflection. The purpose of loading the epoxy with microspheres is to reduce the density of the front face 38 thus, matching the front face acoustic impedance with the acoustic impedance of the medium in which the sandwich structure 36 is immersed. In this case, the sandwich structure 36 is immersed in water. This concept is explained further in our U.S. patent application Ser. No. 08/096,238 entitled "High Modulus Composite Materials Which Acoustically Match Water For Sonar Transparency", filed Jul. 26, 1993 and herein incorporated by reference.

A 770 KHz beam is produced by acoustic transmitter 48 which impinges at an angle on the sandwich structure 36. After being reflected, the beam is accepted by acoustic receiver 50. With water filling the sandwich structure chamber 44, the acoustic transmitter signal 54 is reflected from the stainless steel back surface 40. With air or curing resin filling the sandwich structure chamber 44, the acoustic transmitter signal 52 is reflected from the inner surface 56 of the epoxy front face 38 because of the acoustic impedance mismatch between the front face 38 and the air filled or curing epoxy-filled chamber 44.

Liquid epoxy resin mixed with a curing agent or hardener is then poured into the epoxy/steel sandwich structure 36, the magnitude of the signal reflected from the epoxy/stainless steel sandwich structure 36 is then recorded at different time intervals during the cure of the epoxy.

Figure 3:
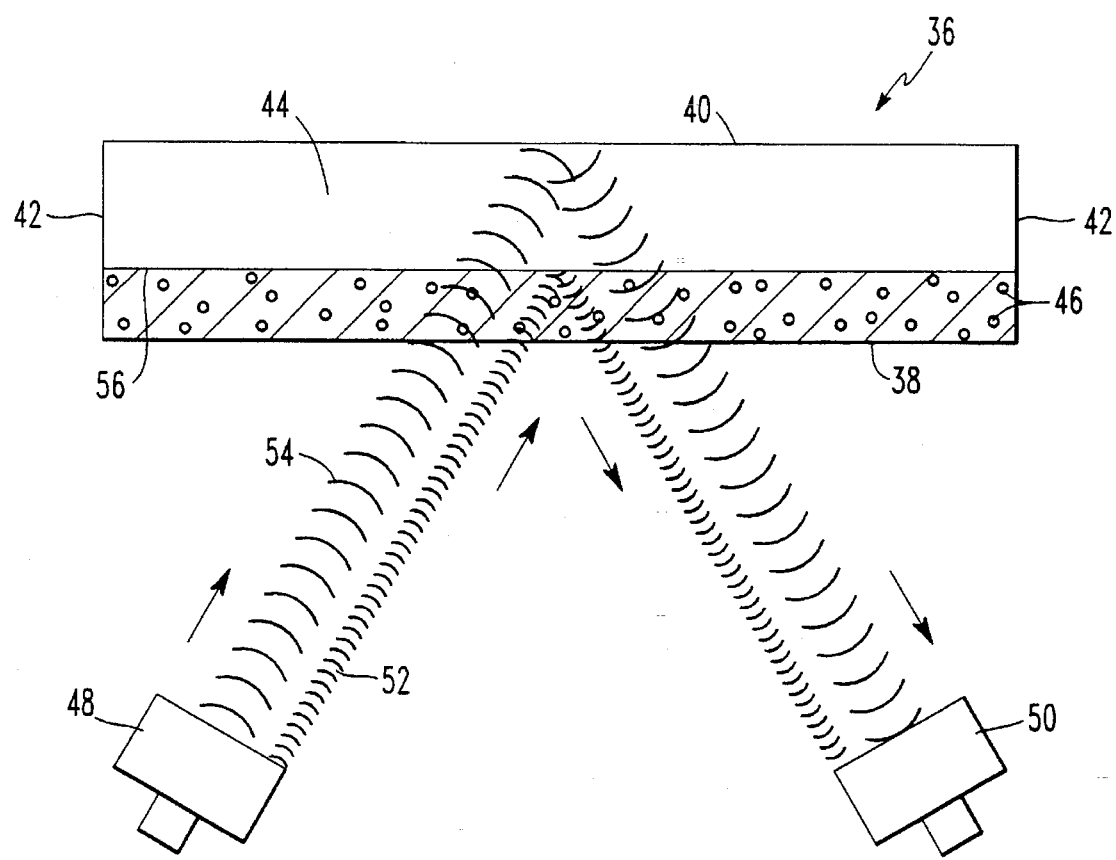
FIG. 3 is a diagramatic of apparatus utilized to obtain sound reflectivity measurement from a composite material shown in cross-section, in accordance with the presently preferred invention.
Figure 4:
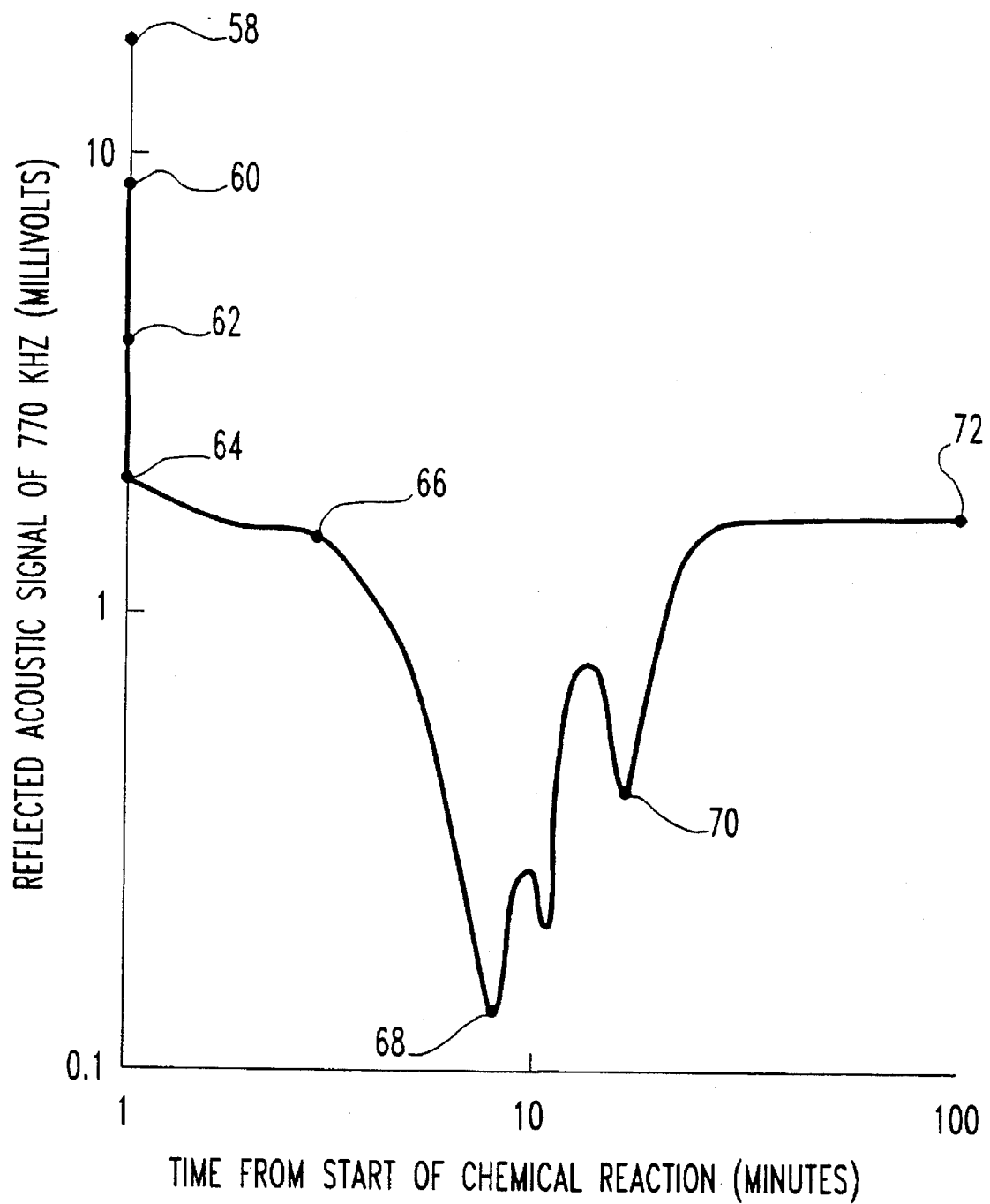
FIG. 4 is a graph presenting the data recorded utilizing the apparatus shown in FIG. 3.

Results of the test using the apparatus described in FIG. 3 are shown in FIG. 4 in a graph which plots reflected acoustic signal versus cure time (t). For comparison purposes measurements are made of the 770 KHz acoustic signal being reflected from a stainless steel plate (not shown) and "POLAROID" material (not shown), vibration and sound-absorbing polyurethane, both positioned in the water-filled sandwich structure chamber 44 at t=0.

The magnitude of the reflected signal from the stainless steel plate was approximately 18 millivolts (mv) at 58. The air-filled epoxy/stainless steel sandwich 36 immersed in water reflected a signal with a magnitude of 9 mv at 60. The same value is reflected with water filling the sandwich structure chamber 44 as is reflected from the steel back surface 40 because there is negligible signal loss in the water. The "POLAROID" material reflected a signal of 4 mv at 62.

As an uncured epoxy was then poured into the empty sandwich structure chamber 44 (still t=0) the value of the reflected signal fell from approximately 9 mv at 60 to approximately 2 mv at 64. The reflected signal decreased as the epoxy went from a state of liquid to a state of gelationization as can be seen at 66 and 68, respectively. The value of the reflected signal is at a minimum from approximately 0.13 mv to 0.4 mv at 68 and 70 when the epoxy is in a state of gelationization, t=~8 minutes to t=~15 minutes, respectively. After t=~100 minutes, the reflected signal is measured to be approximately 2.3 mv at 72. This test demonstrates that sound waves are able to pass through the sound wave non-reflecting front face 36 and are absorbed within the curing epoxy with maximum absorption and minimum reflection when the epoxy is at a state of gelationization.

Figure 5:
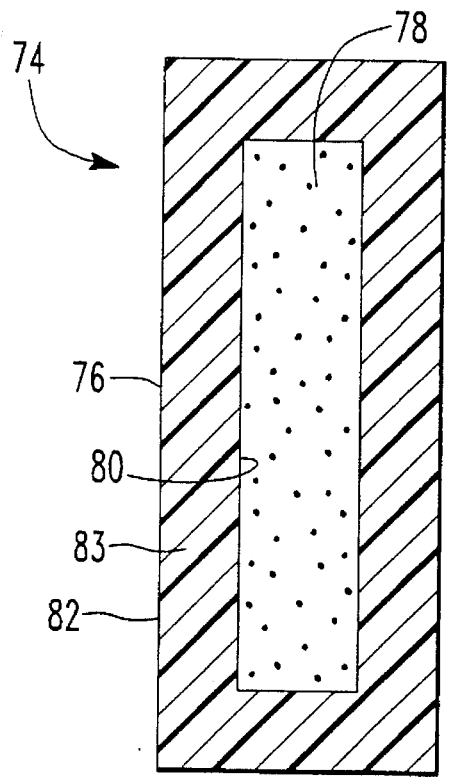
FIG. 5 is a sectional view of a presently preferred embodiment of a sound wave-absorbing, non-reflecting structure to be immersed in a liquid.

Referring to FIG. 5, a non-reflecting, wave-absorbing structure 74 utilized to absorb a sound wave traveling through a liquid is illustrated. The non-reflecting, wave-absorbing structure 74 is immersed in a liquid (not shown) and consists of a non-reflecting outer structure 76 and a wave-absorbing core 78. The outer structure 76 takes the form of a six-sided rectangular structure having an interior surface 80, an exterior surface 82 and an intermediate portion 83. The outer structure is preferably composed of a material having an acoustic impedance which matches the acoustic impedance of the liquid in which it is immersed. The wave-absorbing core 78 is preferably an epoxy in a chemical state of gelationization.

The matching of acoustic impedances of the liquid and the outer structure 76 enables the sound wave to be transmitted through the interface of the liquid and outer structure exterior surface 82 without appreciable reflection. In the instance the medium is water, the presently preferred invention will preferably match the acoustic impedance of the non-reflecting structure to water. The wave-absorbing core 78 then absorbs the sound waves. Further, by matching the acoustic impedance at the outer structure interior surface 80 with that of the wave-absorbing core 78 there will be no appreciable reflection of the sound wave as the sound wave passes from the outer structure 76 to the wave-absorbing core 78.

The outer structure 76 also can be made to acoustically match the liquid by forming the outer structure 76 from a material with a molecular structure which is elastic in one direction and non-elastic in the opposite direction. By changing the molecular structure of the material the acoustic impedance is also changed. For example, tin, when stretched in one direction causes twining, a permanent change in the tin crystal structure. Likewise, Biometal, a titanium/nickel alloy, contracts when heated so as to give a quasi-elastic effect in one direction and a non-quasi-elastic effect in the opposite direction.

With respect to the wave-absorbing core 78, the presently preferred invention provides several methods of creating an epoxy having a permanent state of gelationization. One method of creating an epoxy in a permanent state of gelation is by chain extending the epoxy. The gelationization state of an epoxy is characterized by the formation of large molecules that are neither cross-linked nor form crystalline regions. Thus, by eliminating the curing agent there would be no cross-linking of the molecules.

For example, a precatalyzed epoxy resin such as Epon 829 whose weight per epoxy equivalent is approximately 190 can be reacted with varying amounts of a chain extender such as hisphenol having a weight per epoxy equivalent of 114 to produce an epoxy terminated long chain molecule. Alternately, one can obtain epoxy resins having high weight per epoxy equivalents and consequently high molecular weights. Such long chain, high molecular weight epoxies can themselves form gel-like solids which are thermoplastic or can be lightly cross-linked using among other things, an amine catalyst to form a thermosetting gel-like solid.

The epoxy molecular weight and thus, sound absorbing capacity can be modulated, by using suitable catalysts and temperatures. One hundred grams of Epon 828, obtained from Shell Chemical Company, Houston, Tex., a low molecular weight epoxy, can be reacted with 26 grams of Jeffamine D 230, a difunctional amine curative having a molecular weight of 230 and 100 grams of Jeffamine D 2000, a high molecular weight, long chain difunctional amine curative. Both Jeffamine chemicals are obtainable from FBC Chemical Company, Pa. The mixture can be placed in an oven at 70°C. for 6 hours and then at 100° C. for 2 hours to cure completely. The cured material has a $T_g$, glass transition temperature, of −20° C., thus at room temperature it is a flexible, rubbery, gel-like solid. Room temperature is considered to be between approximately 22° C. and 28° C.

Another method of creating a state of gelationization is by applying cavitation or other means of temperature control to prevent the wave-absorbing material from reaching a state of cure. For example, a wire carrying an electric current can be immersed in a thermoplastic to supply heat preventing the thermoplastic from curing or changing a cured thermoplastic to a thermoplastic in a state of gelationization.

Figure 6:
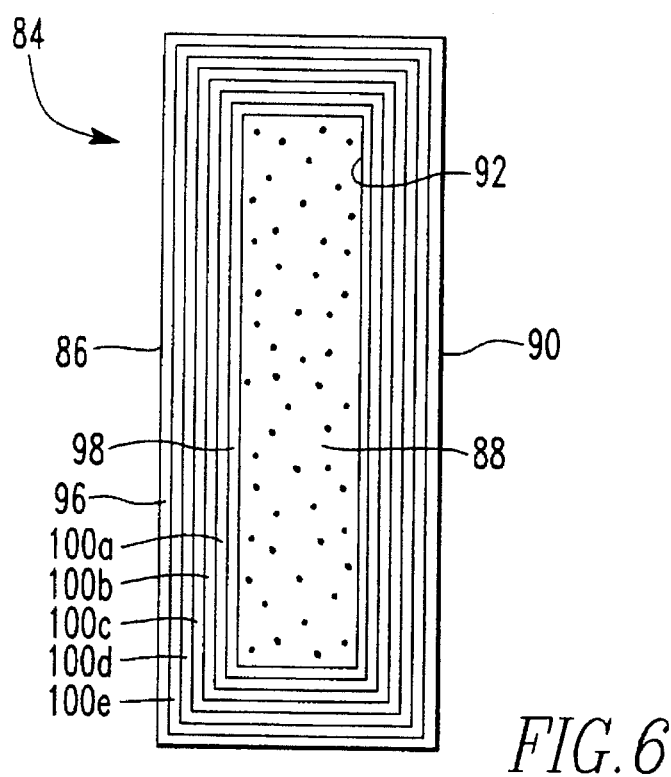
FIG. 6 is a sectional view of a second presently preferred embodiment of a sound wave-absorbing, non-reflecting structure to be immersed in a solid or gas.

In the instance where the medium is a solid or a gas, the presently preferred invention provides a non-reflecting, wave-absorbing structure 84, as shown in FIG. 6. The non-reflecting, wave-absorbing structure 84 includes a non-reflecting outer structure 86 and a wave-absorbing core 88. The wave-absorbing core 88 is preferably an epoxy in the state of gelationization. The non-reflecting outer structure 86 is in the form of a six-sided structure having an exterior surface 90 and interior surface 92. The six-sides are each composed of a series of laminate. The outer lamina 96 positioned on the exterior surface 90 and adjacent the solid or gas medium has generally the same acoustic impedance as the medium. The inner lamina 98 positioned on the interior surface 92 and adjacent the wave-absorbing material 88 has generally the same acoustic impedance as the wave-absorbing material 88. Intermediate laminae 100 positioned between the inner and outer laminae 96,98 have graduated acoustic impedances such that there is no substantial change in acoustic impedance from one lamina to any adjacent lamina.

As the sound waves travel from the solid or gas medium through the non-reflecting outer structure 86 there will be no appreciable reflection because of the insignificant change in the acoustic impedance between adjacent laminae. As the sound wave moves from the non-reflecting outer structure 86 to the wave-absorbing core 88 there will also be no appreciable reflection at the interface of the outer structure 86 and wave-absorbing core 88 because of the acoustic matching therebetween. Although the outer structure 86 is in the shape of a rectangular structure, it may take any shape.

Figure 7:
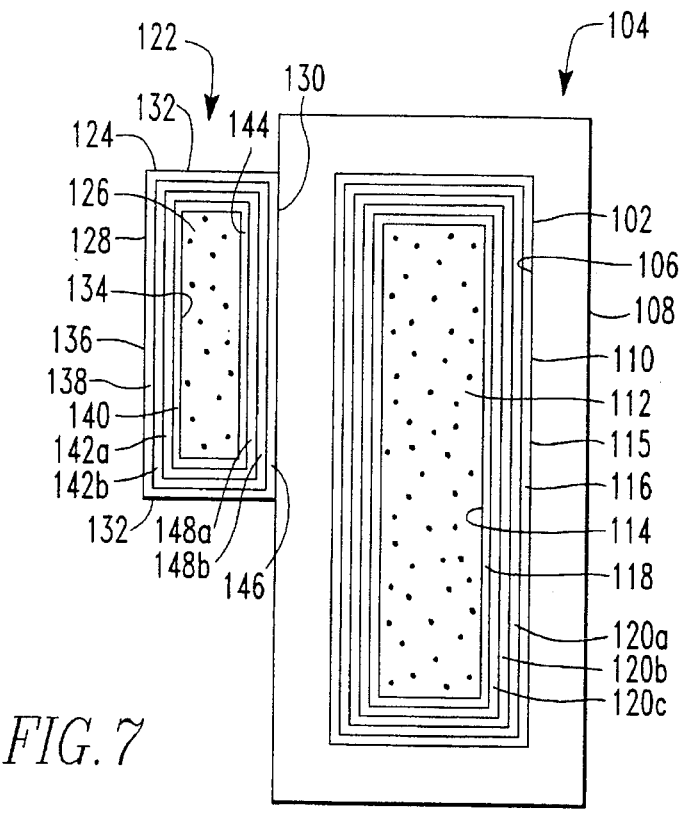
FIG. 7 is a sectional view of the sound wave-absorbing, non-reflecting structure shown in FIG. 6 positioned within a solid structure and attached to the outer surface thereof.

FIG. 7 illustrates a first non-reflecting, wave-absorbing structure 102 being buried within a solid structure 104. The solid structure 104 has an inner surface 106 and an outer surface 108. The non-reflecting wave-absorbing structure 102 consists of non-reflecting, outer structure 110 and wave-absorbing core 112. The wave-absorbing core 112 is preferably an epoxy in the state of gelationization. Outer structure 110 is a six-sided rectangular structure having an interior surface 114 and exterior surface 115 and an intermediate portion therebetween. Each of the sides are made from a series of laminae similar to the configuration illustrated in FIG. 6. Outer lamina 116 is positioned adjacent the solid structure 104 and has a similar acoustic impedance as that of the solid structure 104. Inner lamina 118 approximately acoustically matches the acoustic impedance of the wave-absorbing core 112. Intermediate laminae 120 are positioned between the inner lamina 118 and outer lamina 116 at the intermediate portion and have graduated acoustic impedances such that there is no substantial change in acoustic impedance from one lamina to the adjacent lamina preventing appreciable reflection of the sound wave.

As sound waves travel through the solid structure 104 and impinge on outer lamina 116, there will be no appreciable reflection at the interface of solid structure 104 and outer laminates 116 because of the acoustic impedances match therebetween. Likewise, as the wave moves through the series of laminae, to the wave-absorbing core 112 there will be no appreciable reflection. Once the wave is transmitted through the outer structure the wave will be absorbed by the wave-absorbing core 112.

FIG. 7 further illustrates a second non-reflecting, wave-absorbing structure 122 attached to the solid structure outer surface 108 similar to the non-reflecting, wave-absorbing structure illustrated in FIG. 6. The second non-reflecting, wave-absorbing structure 122 has a non-reflecting outer structure 124 and a wave-absorbing core 126. Outer structure 124 is a six-sided rectangular structure including a front face 128, a back face 130 and four side faces 132. The outer structure 124 further includes an interior surface and an exterior surface 136. The back face 130 is attached to the solid structure outer surface 108. The front face 128, the back face 130 and the four side faces 132 are each made of a series of laminae.

The series of laminae which form the front face 128 and side faces 132 each include an outer lamina 138, an inner lamina 140, and a series of intermediate laminae 142. The series of laminae which form the back face 130 likewise comprise an inner lamina 144, an outer lamina 146 and a series of intermediate laminae 148. The front face outer lamina 138 is positioned on the outer structure exterior surface 136 and substantially acoustically matches the medium in which the second non-reflecting, wave-absorbing structure 122 is immersed. Both the front face inner lamina 140 and back face inner lamina 144 are positioned adjacent to the wave-absorbing core 126 and substantially acoustically match the wave-absorbing core 126. The back face outer lamina 146 is positioned adjacent to the solid structure outer surface 108 and approximately acoustically matches the solid structure outer surface 108. The series of intermediate laminae of both the front face 128 and back face 130 have graduated acoustic impedances such that there is no substantial change in acoustic impedance from one lamina to any adjacent lamina preventing appreciable reflection of sound waves.

The second non-reflecting, wave-absorbing structure 122 absorbs sound waves from impinging upon outer surface 108 of the solid structure 104. Sound waves contacting the front face 128 and side faces 132 of the outer structure 124 will be transmitted therethrough to the wave-absorbing core 126 where the waves will be substantially absorbed. Sound waves originating from within the solid structure 104 and impinging on the back face 130 of the outer structure 124 will be transmitted therethrough to the wave-absorbing core 126 where they too will be absorbed. No appreciable reflection of sound waves will occur because of the acoustic matching at the many interfaces.

Although not illustrated it is possible to partially or entirely enclose the solid structure 104 with a non-reflecting, wave-absorbing structure similar to second non-reflecting wave-absorbing structure 122. Further the solid structure 104 may be made from a material having an acoustic impedance substantially the same as that of the medium in which it is immersed.

Figure 8:
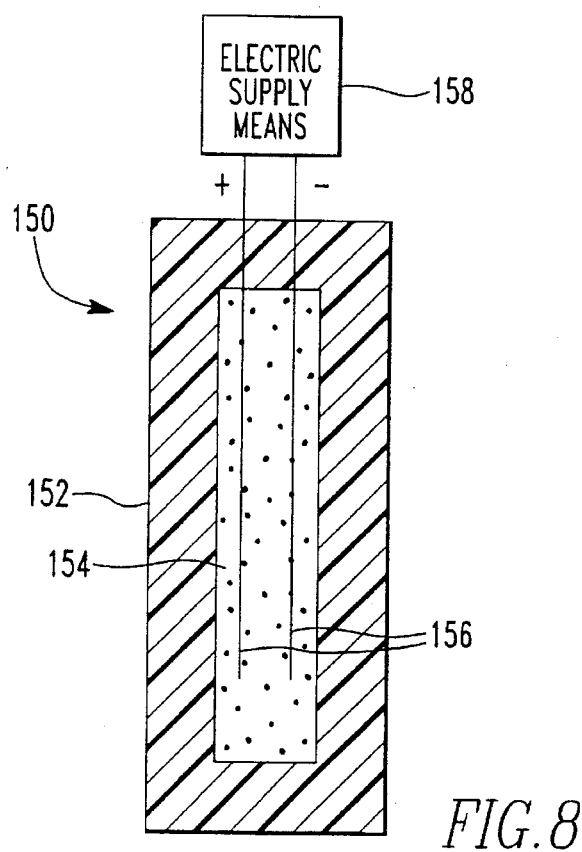
FIG. 8 is a sectional view of a presently preferred embodiment of the radio wave-absorbing, non-reflecting structure.

In FIG. 8 the non-reflecting, radio wave-absorbing structure 150 includes an outer structure 152 made from a material having a low dielectric constant material and a wave-absorbing core 154. Low dielectric constant materials will allow for transmission of radio waves through the outer structure 152. The wave-absorbing core 154 contained within the outer structure 150 is preferably a plasma, a gas in an ionized state, which will absorb radio wave pulses. Wire electrodes 156 are immersed within the wave-absorbing core 154 and connected to an electrical supply means 158 to charge the gas. In the instance the gas is air, a plasma can be created by maintaining the air at a pressure of between 10 to 100 Torr and charging the air with approximately 3 Kv alternating current with the electric supply means 158. The radio waves will impact the outer structure 152 and will be transmitted therethrough to the wave-absorbing core 154 where the waves will be absorbed by the plasma.

The non-reflecting, wave-absorbing structure described herein can be utililized in many applications where it is necessary to absorb sound, radio or radiation waves. Particularly, the non-reflecting, wave-absorbing structure may be utilized in stealth technology which would prevent the detection of the stealth submarine by sonar. Additionally, the present preferred invention can be utilized to quite aircraft engines, machinery, homes and offices and to control acoustics in concert halls.

While presently preferred embodiments of the invention have been described, it is to be distinctly understood that the invention is not limited thereto but may be otherwise embodied and practiced within the scope of the following claims.

We claim:

1. An apparatus for absorption of a sound wave traveling through a first medium comprising:
   (a) non-reflecting means for allowing the transmission therethrough of said sound wave impinging on said non-reflecting means; and
   (b) a wave-absorbing means for absorbing said sound wave being transmitted through said non-reflecting means, said wave-absorbing means being positioned adjacent to said non-reflecting means such that said sound wave will first encounter said non-reflecting means and will thereafter encounter said wave-absorbing means, wherein said wave-absorbing means is a material which exhibits characteristics of being in a permanent state of gelatinization.

2. The apparatus of claim 1 wherein said gelationization material is an epoxy resin.

3. The apparatus of claim 1 wherein said gelationization material is selected from the group consisting of concrete in a state of gelatinization, polyurethane in a state of gelationization, metal in a state of gelatinization, a plastic in a molten state and a wax in a molten state.

4. The apparatus of claim 1 wherein said non-reflecting means has an acoustic impedance which matches an acoustic impedance of the first medium.

5. The apparatus of claim 1 wherein said non-reflecting means has a first surface, a second surface and an intermediate portion, said intermediate portion being positioned between both said first surface and said second surface, said first surface being positioned adjacent said first medium, said second surface being positioned adjacent said wave-absorbing means, said first surface having an acoustic impedance which matches an acoustic impedance of said first medium, said second surface having an acoustic impedance which matches an acoustic impedance of said wave-absorbing means, said intermediate portion having an acoustic impedance which varies from said first medium acoustic impedance no said wave-absorbing acoustic impedance.

6. The apparatus of claim 5 wherein both said non-reflecting means first surface and said non-reflecting means second surface are each a lamina and said non-reflecting intermediate portion is a series of laminae.

7. The apparatus of claim 1 wherein said non-reflecting means substantially encases said wave-absorbing means, said non-reflecting means having an inner surface, an exterior surface, and an intermediate portion, said inner surface being positioned adjacent said wave-absorbing means and having an acoustic impedance which matches an acoustic impedance of said wave-absorbing means, said exterior surface having an acoustic impedance which matches an acoustic impedance of a medium being positioned adjacent said exterior surface, said intermediate portion having an acoustic impedance which varies between said inner surface acoustic impedance and said exterior surface acoustic impedance.

8. The apparatus of claim 1 wherein said wave-absorbing means is a supercooled liquid having a glass transition temperature, $T_g$, less than 28° C.

9. A method for absorption of a sound wave traveling through a first medium comprising the steps of:
   (a) creating a wave-absorbing material which exhibits characteristics of being a in a permanent state of gelatinization;
   (b) placing said wave-absorbing material adjacent non-reflecting means for allowing the transmission of said sound wave therethrough; and
   (c) positioning said non-reflecting means in the first medium such that said sound wave will impinge on said non reflecting means and will be transmitted therethrough and thereafter be absorbed by said wave-absorbing means.

10. The method of claim 9 wherein step of creating said wave-absorbing means is performed by sustaining an epoxy at a state of gelatinization.

11. The method of claim 10 wherein the step of sustaining a state of gelatinization is performed by one of forming partial cavities within the wave-absorbing means and controlling said epoxy temperature to prevent curing of said epoxy.

12. The method of claim 11 wherein the step of sustaining a state of gelationization is performed by immersing a wire having electric current passing therethrough in said epoxy.

13. The method of claim 10 wherein the step of sustaining a state of gelationization is performed by chain-extending said epoxy.

* * * * *